United States Patent [19]

Gaylord et al.

[11] 4,324,171
[45] Apr. 13, 1982

[54] FLUID DEVICE AND METHOD FOR MAKING

[75] Inventors: Richard P. Gaylord, St. Joseph, Mich.; Wendell E. Miller, Warsaw, Ind.

[73] Assignee: Clark Equipment Company, Buchanan, Mich.

[21] Appl. No.: 55,652

[22] Filed: Jul. 9, 1979

Related U.S. Application Data

[62] Division of Ser. No. 916,376, Jun. 16, 1978, Pat. No. 4,187,766.

[51] Int. Cl.³ .......................... F16J 11/02; F16J 15/18
[52] U.S. Cl. ..................... 92/169; 92/165 R; 92/260; 29/156.4 R
[58] Field of Search .................. 92/260, 169, 165 R; 29/147, 156.4 R, 156.4 WL

[56] References Cited

U.S. PATENT DOCUMENTS

| 1,620,728 | 3/1927 | Jackson. | |
|---|---|---|---|
| 2,414,492 | 1/1947 | Urschel et al. | 29/447 |
| 2,997,026 | 8/1961 | Zimmer | 92/169 |
| 3,313,215 | 4/1967 | Bieri | 92/165 R |
| 4,187,766 | 2/1980 | Gaylord | 92/169 |

FOREIGN PATENT DOCUMENTS 2319294  11/1974  Fed. Rep. of Germany.

*Primary Examiner*—Paul E. Maslousky
*Attorney, Agent, or Firm*—Harry G. Thibault

[57] ABSTRACT

A reciprocating fluid device is provided in which dynamic stresses in the weld between the cylindrical tube and the base thereof are reduced by prestressing the tube proximal to the weld prior to welding.

17 Claims, 9 Drawing Figures

FLUID DEVICE AND METHOD FOR MAKING

CROSS-REFERENCE TO RELATED PATENT

This is a division of application Ser. No. 916,376, filed June 16, 1978, now U.S. Pat. No. 4,187,766 Gaylord, dated Feb. 12, 1980. The claims of such patent dominate this case and, in addition, cover specifically the device and method illustrated by FIGS. 1–5 of the drawing in this case and the corresponding description.

BACKGROUND OF THE INVENTION

1. Field of the Invention

The present invention relates generally to pressure vessels that include an end element that is bonded or welded to a cylindrical tube, and more particularly to reciprocating fluid devices of the type having a welded tube and end element assembly.

2. Description of the Prior Art

Reciprocating fluid devices including single action cylinders, double action cylinders, shock or energy absorbers, and piston type accumulators have often included a bond or weld to attach an end element or base to the barrel or cylindrical tube, since a bonded or welded construction is more attractive and consumes less mounting space than older constructions that utilize tie bolts between the base and head of the cylinder.

Operating pressures for these types of fluid devices, when used in hydraulic systems, often are in excess of 2500 psi, and in some applications are in excess of 6000 psi. Thus the bond or weld between the tube and base is subjected to high cyclic stresses. In addition, in many applications the fluid device is subjected to fluid pressures that are higher than the operating pressure of the hydraulic system due to gravity or inertia loading or to the geometry of mechanical linkages which use the forces of one hydraulic cylinder to place a greater load on another hydraulic cylinder.

The failure in a bonded joint, whether of brazed or welded construction, has been caused by cyclic and fluid pressure induced stresses in the brazed joint or weld by resultant cyclic elastic diametral tensile strains in the barrel or cylindrical tube at a location longitudinally proximal to the bond or weld. These elastic diametral tensile strains have induced bending stresses in the bond or weld that are additive to cyclic and fluid pressure induced longitudinal stresses in the weld.

The welding of the base to the cylindrical tube is customarily arc welded by an automatic machine that feeds a fluxless wire into the weld; and oxygen is excluded from the molten material either by an envelope of inert gas or by a granular flux which submerges the arc.

Some designs have utilized brazing for attaching the bases to the cylindrical tubes; and, because of the lower temperatures that are required and the need to restrict the heating of the tube to a localized area, silver alloy brazing materials have been used in preference to copper.

SUMMARY OF THE INVENTION

In accordance with the broader aspects of this invention, there is provided a reciprocating fluid device of the type having a tube and end element assembly. The tube and end element assembly includes an end element having an inner end and an outer end, and having a substantially circular pilot of a first diameter that is proximal to the inner end. The tube and end element assembly further includes a cylindrical tube having first and second ends, and having a first inside diameter portion that is proximal to the first end. In addition, the tube and end element assembly includes a separate stressing member inside the tube. The first inside diameter portion of the tube is interference assembled over the circular stressing member whereby the stressing member mechanically induces an elastic diametral tensile strain in the tube proximal to the stressing member. The cylindrical tube is heat-bonded to the end element by any suitable process such as welding or brazing; and the interference fit between the first inside diameter of the cylindrical tube and the stressing member induces an elastic diametral tensile strain in the tube proximal to the bond between the end element and the tube. Thus, when the inside of the reciprocating fluid device is subjected to cyclic pressures, elastic diametral tensile strains in the tube proximal to the heat-bonded joint are precluded or reduced, depending upon the magnitude of the prestressing and prestraining as induced by the cylindrical stressing member.

It is an object of the present invention to provide a tube and end element assembly for use with cyclic fluid pressures in which fatigue resistance of a bond or weld joining the tube to the end element thereof is improved.

This and other advantages and objects of the present invention will be readily apparent when referring to the following detailed description wherein:

DESCRIPTION OF PREFERRED EMBODIMENT

Figure 1:
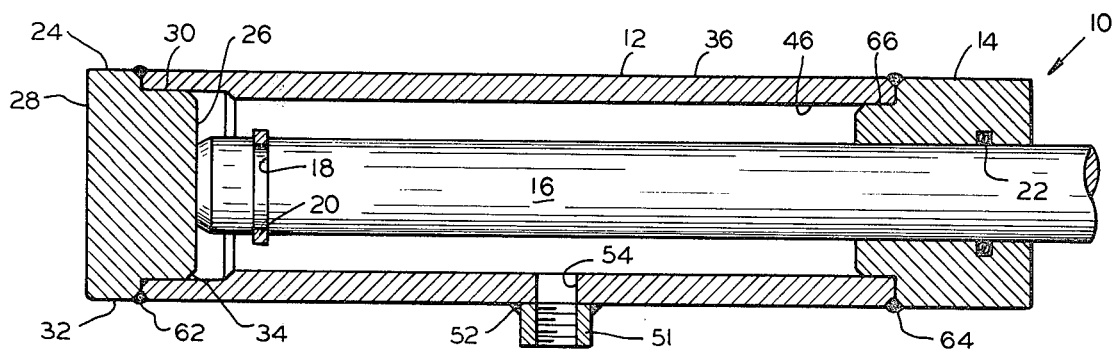
FIG. 1 is a cross-sectional view of a reciprocating fluid device or single action cylinder.

Referring now to FIG. 1, a reciprocating fluid device for single action cylinder 10 includes a tube and end element assembly 12, and end element or head 14, a displacement piston 16 having a retaining ring groove 18, a retaining ring 20, and a rod seal 22.

The tube and end element assembly 12 includes an end element or base 24 having an inner end 26, an outer end 28, a stressing member or pilot 30 of circular or cylindrical shape, a portion 32, and a chamfer 34.

Figure 4:
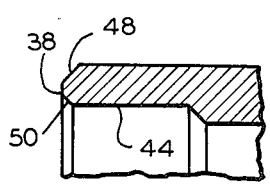
FIG. 4 is a partial cross-sectional view of the barrel or cylindrical tube of the fluid device of FIG. 1.

Referring now to FIGS. 1 and 4, the tube and end element assembly 12 also includes a barrel or cylindrical tube 36 having a first end 38, a second end 40, an outside diameter 42, a first inside diameter 44, a second inside diameter 46, an outside or weld chamfer 48, and an inside chamfer 50.

Referring again to FIG. 1, the tube and end element assembly includes a threaded port 51 which is attached to the cylindrical tube 36 by a weld 52 and which communicates to the inside of the cylindrical tube 36 by a hole 54.

Figure 3:
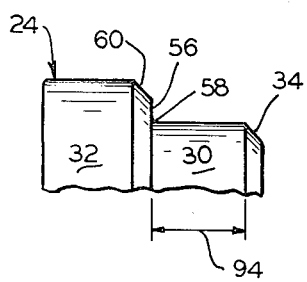
FIG. 3 is an enlarged and partial view of the end element or base used in the fluid devices of FIGS. 1 and 2.

Referring now to FIG. 3, the end element or base 24 includes a shoulder 56 that is juxtaposed to the pilot 30, a fillet radius 58 that is intermediate of the pilot 30 and the shoulder 56, and a weld chamfer 60 that is intermediate of the shoulder 56 and the portion 32. The portion 32 is preferably substantially equal in diameter to the outside diameter 42 of the tube 36.

Referring now to FIGS. 1, 3, and 4, the tube and end element assembly 12 is bonded or welded together by a welded joint 62 which is deposited between chamfers 48 and 60. A welded joint 64 bonds the end element or head 14 to the cylindrical tube 36.

Figure 2:
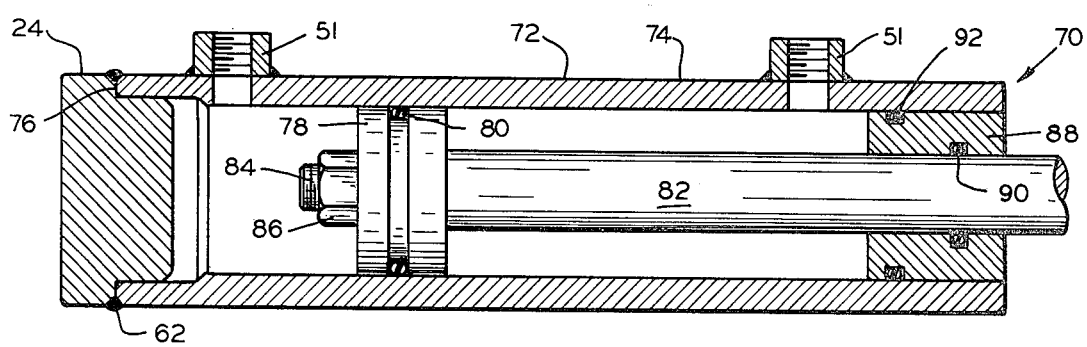
FIG. 2 is a cross-sectional view of a reciprocating fluid device or double action cylinder.

Referring now to FIG. 2, a reciprocating fluid device or double action cylinder 70 includes a tube and end element assembly 72 that includes a barrel or cylindrical tube 74 that is similar to the cylindrical tube 36, and that includes the end element or base 24. A first end 76 of the cylindrical tube 74 includes the same details as have been previously described for the first end 38 of the tube 36.

The fluid device or double action cylinder 70 also includes a piston 78 having a piston seal 80 thereupon, a piston rod 82 that is attached to the piston 78 by a threaded end 84 of the piston rod 82 and by nut 86, and a head 88 that is retained inside the tube 74 by any suitable means (not shown) and which is sealed to the piston rod 82 by a rod seal 90 and to the cylindrical tube 74 by a static head seal 92. A pair of threaded ports 51 are welded to the tube 74 and communicate with the inside of the tube on opposite sides of the piston 78.

Referring now to FIGS. 1–4, in a preferred configuration, the stressing member or pilot 30 of FIG. 3 is larger in diameter than the first inside diameter 44 of the tube 36; so that, when the pilot 30 is pressed into the inside diameter 44, an elastic diametral tensile strain is induced into the tube 36 proximal to the first end 38. The pilot 30 has a length 94 which extends into the tube 36 distal from the end 38 for a distance that exceeds the portion of the tube 36 that is heated to stress-relieving temperatures and that is annealed or stress-relieved by the depositing of the welded joint 62 between the chamfers 48 and 60; so that the welding process does not relieve the radially induced strain in the tube 36.

Figure 5:
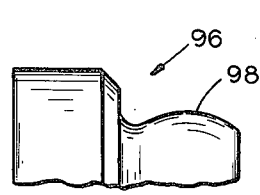
FIG. 5 is a partial and enlarged view showing a base similar to that of FIG. 3 but with the pilot thereof modified.

Referring now to FIG. 5, in one modification, an end element or base 96 is similar to the end element or base 24; except that a stressing member or spherically radiused pilot 98 has replaced the stressing member or pilot 30.

Figure 6:
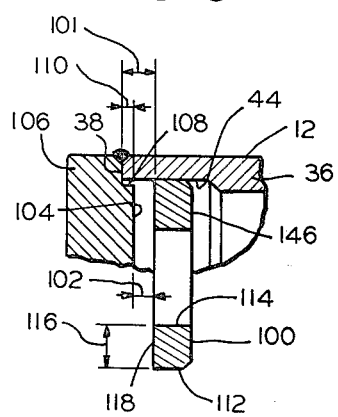
FIG. 6 is a partial cross-sectional view showing a construction according to this invention for the fluid devices of FIGS. 1 and 2.

Referring now to FIG. 6, in a preferred embodiment of this invention, a stressing member 100, which serves as a means for inducing elastic diametral tensile strain in the barrel 36, is pressed into the first inside diameter 44, preferably to a distance 101 from the end 38 that leaves a space 102 between an aligning pilot 104 of an end element or base 106. In this construction, a small radial clearance 108 is left between the aligning pilot 104 and the first inside diameter 44; so that the aligning pilot 104 may be inserted into the inside diameter 44 by hand. Also, in this configuration, the aligning pilot 104 has a length 110 which is shorter than the length 94 of the pilot 30 which appears in FIG. 3.

Referring again to FIG. 6, the stressing member 100 includes a circular outside diameter 112 which is preferably cylindrical, an opening 114 which leaves a radial wall thickness 116, and a face 118. The opening 114 is optional as is the sizing thereof in comparison to the radial wall thickness 116.

Figure 7:
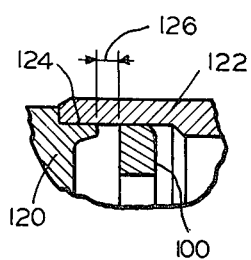
FIG. 7 is a partial cross-sectional view showing a second embodiment of this invention for the fluid devices of FIGS. 1 and 2.

Referring now to FIG. 7, in another embodiment, an end element or base 120 is bonded or joined to a cylindrical tube 122 by a brazed joint 124 and the stressing member 100 again serves to induce an elastic diametral tensile strain in the tube 122 proximal to the brazed joint 124. Since the stressing member 100 is spaced at a distance 126 from the brazed joint 124, portions of the base 120 and the tube 122 proximal to the brazed joint 124 can be heated to brazing temperature without stress-relieving the radially stressed portion of the tube 122 and/or the stressing member 100, as would be the case if the stressing member 100 were integral with the end element or base 120.

Figure 8:
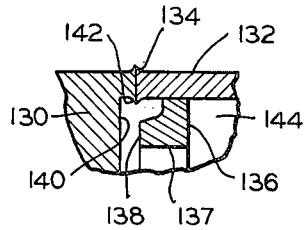
FIG. 8 is a partial cross-sectional view showing a third embodiment of this invention for the fluid devices of FIGS. 1 and 2.

Referring now to FIG. 8, in another embodiment an end element or base 130 is friction welded to a cylindrical tube 132 by a friction weld 134. A stressing member 136 is similar to the stressing member 100 of FIG. 6 but includes a longitudinally extending inner flange 137. The stressing member 136 induces an elastic diametral tensile strain into the cylindrical tube 132 proximal to the weld 134, and also, since the stressing member 136 is separate from the end element or base 130, relative rotational motion between the base 130 and the tube 132, which is required for friction welding, may be provided without frictional interference between the stressing member 136 and the base 130. The stressing member 136 includes an inner face 138 which is preferably spaced apart from a surface 140 of the base 130 during the friction welding operation. After completion of the friction welding operation, the stressing member 136 can be pressed inwardly to where the inner face 138 of the stressing member 136 abuts the surface 140 of the base 130 (not shown, similar to FIG. 9), thereby precluding the possibility of entrance of weld flash material 142 into a fluid working space 144.

Figure 9:
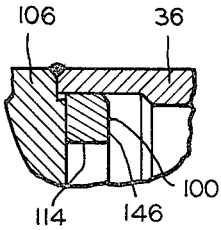
FIG. 9 is a partial cross-sectional view showing the stressing member of FIG. 6 pressed back against the base thereof subsequent to the welding operation.

Referring now to FIGS. 6–9, in the modifications of FIGS. 6, 7, and 8, the stressing member, such as the stressing member 100 of FIGS. 6 and 7, may be pressed into abutting relationship with the end element or base after welding, as shown in FIG. 9; so that a piston, such as the piston 78 of FIG. 2 may use a surface. The operation mentioned may be carried out in a conventional manner by holding the base end of the tube and end element assembly in a press, inserting a mandrel into the opposite end of the assembly, and by means of such mandrel applying a force on the stressing member to press it into abutting relationship with the end element; such operation may be carried out with the parts involved at room temperature. If desired, the opening 114 of FIG. 6 may be either reduced in size or eliminated; so that the piston 16 of FIG. 1 or the threaded end 84 of the piston rod 82 of FIG. 2 may stop directly upon the surface 146.

In a preferred embodiment, the inside diameter 44 of the cylindrical tube 36 is approximately 7 inches; and the pilot 30 is approximately 0.006 inches larger than the inside diameter 44. Thus, the diametral interference between the pilot 30 and the inside diameter 44 is approximately 0.000857 inches per inch; and the induced elastic diametral tensile strain is also approximately 0.000857 inches per inch. While it is desirable to induce an elastic diametral tensile strain in the inside diameter 44 proximal to the end 38 that exceeds the tensile strains which are introduced by cyclic fluid operating pressures, it can be appreciated that even introducing a diametral tensile strain that is a fraction of the fluid pressure induced tensile strains will increase the fatigue life of the bonded joints, such as the welded joint 62, by decreasing the magnitude of the fluid-caused stresses which are applied to the bonded joint by elastic expansion of the tube 36 proximal to the bonded joint, or welded joint 62. Thus it is contemplated that appreciable increases in fatigue life can be achieved by induced and elastic diametral tensile strains as low as 0.0002 inches per inch; and, in embodiments utilizing the stressing member 100, having an opening 114 therein, it is contemplated that, due to the increased resiliency in outside diameter 112 of the stressing member 100 due to the opening 114, minimum interference fits of 0.0003 inches per inch will often achieve the desired strain of 0.0002 inches per inch in the tube 36.

DESCRIPTION OF PREFERRED METHOD

Referring now to FIGS. 6–9, the preferred method for closing one end of a cylindrical tube includes: mechanically inducing an elastic diametral tensile strain into the cylindrical tube 36 proximal to one end 38, placing an end element, such as the base 106 proximal to the end 38, and bonding the end element to the cylindrical tube 36.

The method for mechanically inducing an elastic diametral tensile strain into the cylindrical tube 36 includes inserting the stressing member 100 of FIG. 6, or the stressing member 136 of FIG. 8 into the inside diameter 44. This inserting step preferably includes heating the tube, such as the tube 36, cooling the stressing member and pressing the stressing member, into the inside diameter 44. The placing of the end element 106 proximal to the end 38 preferably comprises manually placing; whereas placing the end element 24 (FIGS. 1–3) proximal to the end 38 preferably comprises the aforementioned heating, cooling, and pressing steps.

The material for the cylindrical tube, such as the cylindrical tube 36 and for the base, are preferably steel; and the bonding step is preferably arc welding. However, it is contemplated that friction welding, silver brazing, copper brazing, and adhesive bonding can also be used in conjunction with the step of mechanically inducing an elastic diametral tensile strain to the cylinder tube, such as the tube 36. It is also contemplated that both nonferrous metals and nonmetallic materials can be utilized more advantageously and product life can be improved by utilizing embodiments and methods herein described.

In summary, the present invention provides a reciprocating fluid device in which premature fatigue failures in the bond between the cylindrical tube and end element are effectively prevented by mechanically inducing an elastic diametral tensile strain in the cylindrical tube proximal to the end element. This elastic diametral tensile strain is induced into the cylindrical tube proximal to one end thereof by interference pressing a separate stressing member.

Preferably, the interference fit between the stressing member and the inside diameter of the cylindrical tube is selected to eliminate all fluid pressure induced diametral strains in this same portion of the cylindrical tube without the mechanically induced strain being appreciably greater than the maximum value of fluid pressure induced diametral tensile strain distal from the stressing member.

However, it is contemplated that prestressing, or prestraining, the cylindrical tube proximal to the end element to only a portion of the fluid pressure induced strain will materially increase the fatigue life of the bond or joint between the tube and end element.

In addition, it is contemplated that, in order to eliminate costly machine operations, such as that shown for sizing the inside of the tube 36 to the inside diameter 44 for a precise interference fit, that an interference fit which causes diametral yielding or plastic strain of the tube 36 proximal to the end 38, and/or diametral yielding or plastic strain in compression of the stressing member 100 can be used; and the residual elastic diametral tensile strain in the cylindrical tube 36 will function as has been previously described. This modification is pictured in FIGS. 1 and 4 wherein a pilot or stressing member 66 of the end element or head 14 is pressed into the inside diameter 46 of the tube 36 without the additional cost of machining the inside diameter 46 to a precise dimension as was done by the inside diameter 44.

The present invention decreases cyclic stresses in the bond or weld. In addition, the separate stressing member provides advantages of heat and friction isolation which are particularly advantageous for use with some of the aforementioned types of bonding.

While only three embodiments of the present invention and three variations in the methods for the making have been described in detail, it will be understood that the detailed descriptions are intended to be illustrative only and that various modifications and changes may be made without departing from the spirit and scope of the present invention. Therefore the limits of the present invention should be determined from the attached claims.

We claim:

1. A tube and end element assembly for a fluid device which tube and end element assembly comprises an end element having an inner end and an outer end;
    a cylindrical tube having first and second ends, having a first inside diameter portion that is proximal to said first end, and being joined to said end element by a bonded joint with said first end disposed proximal to said inner end; and
    means comprising a stressing member that is separate from said end element, that is substantially circular, that is larger than said first inside diameter portion, and that is inserted into said first inside diameter portion proximal to said first end, for mechanically inducing an elastic diametral tensile strain in said tube proximal to said bonded joint and intermediate of said bonded joint and said second end; whereby said mechanically-induced elastic diametral tensile strain reduces cyclic diametral straining of said tube proximal to said bonded joint when cyclic fluid pressures are applied inside said tube.

2. A tube and end element assembly as claimed in claim 1 in which said tube comprises a steel tube; and said bonded joint comprises a heat-bonded joint.

3. A tube and end element assembly as claimed in claim 2 in which said tube includes a stress-relieved portion proximal to said heat-bonded joint that is a result of said heat bonding;
    at least a portion of said stressing member and said elastic diametral strain that is induced by said stressing member are disposed intermediate of said stress-relieved portion and said second end of said tube; and said diametral strain, that is disposed intermediate of said stress-relieved portion and said second end of said tube, exceeds 0.0002 inches per inch.

4. A tube and end element assembly as claimed in claim 2 in which said tube includes a stress-relieved portion proximal to said heat-bonded joint that is a result of said heat bonding;

at least a portion of said stressing member and said elastic diametral strain that is induced by said stressing member are disposed in said stress-relieved portion of said tube; and said diametral strain, that is disposed in said stress-relieved portion exceeds 0.0002 inches per inch subsequent to said heat bonding.

5. A tube and end element assembly as claimed in claims 3 or 4 in which said end element comprises a steel end element; and said heat-bonded joint comprises a welded joint.

6. A tube and end element assembly as claimed in claims 3 or 4 in which said end element comprises a steel end element; and said heat-bonded joint comprises a friction welded joint.

7. A tube and end element assembly as claimed in claims 3 or 4 in which said bonded joint comprises a brazed joint.

8. A tube and end element assembly as claimed in claims 3 or 4 in which said stressing member includes an inner face that substantially abuts said end element, whereby foreign material from said heat-bonded joint is excluded from the inside of said tube and end element assembly.

9. A reciprocating fluid device which comprises an end element having an inner end and an outer end, having a pilot portion proximal to said inner end, having a substantially circular portion that is intermediate of said pilot portion and said outer end and that is larger than said pilot portion, and having a shoulder that is intermediate of said pilot portion and said circular portion;

a steel cylindrical tube having first and second ends, being assembled over said pilot portion with said first end of said tube juxtaposed against said shoulder, having a first inside diameter portion that is intermediate of said pilot portion and said second end of said tube, and being joined to said end element by a heat-bonded joint that produces a stress-relieved portion in said tube proximal to said heat-bonded joint;

means comprising a stressing member that is separate from said end element, that is substantially circular, and that is interference fitted into said first inside diameter portion, for mechanically inducing an elastic diametral tensile strain in said tube proximal to said pilot portion and said heat-bonded joint; and piston means being inserted into said tube, and being longitudinally movable therein, for reacting against fluid in said device; whereby said mechanically-induced elastic diametral strain reduces cyclic diametral straining of said tube proximal to said heat-bonded joint, and reduces cyclic stresses in said heat-bonded joint, in proportion to the magnitude of said mechanically-induced strain in relation to the magnitude of cyclic fluid pressures in said fluid device.

10. A tube and end element assembly as claimed in claim 9 in which at least a portion of said stressing member and said elastic diametral strain that is induced by said stressing member are disposed intermediate of said stress-relieved portion and said second end of said tube; and said diametral strain, that is disposed intermediate of said stress-relieved portion and said second end of said tube, exceeds 0.0002 inches per inch.

11. A tube and end element assembly as claimed in claim 9 in which at least a portion of said stressing member and said elastic diametral strain that is induced by said stressing member are disposed in said stress-relieved portion of said tube; and said diametral strain, that is disposed in said stress-relieved portion exceeds 0.0002 inches per inch subsequent to said heat bonding.

12. A method for producing a bonded joint between a cylindrical tube and an end element, and for reducing the magnitude of cyclic stresses that are induced into said bonded joint by cyclic fluid pressures inside said tube, which method comprises:

a. mechanically inducing an elastic diametral tensile strain into said cylindrical tube proximal to one end thereof by inserting a stressing member that is separate from said end element into said tube proximal to said one end thereof;

b. placing said end element proximal to said one end of said cylindrical tube; and c. bonding said end element to said cylindrical tube.

13. A method as claimed in claim 12 in which said tube comprises a steel tube; and said bonding step comprises heating a portion of said tube proximal to said first end thereof to stress-relieving temperatures with resultant stress-relieving of said heated portion.

14. A method as claimed in claim 13 in which said inserting step comprises locating at least a portion of said stressing member intermediate of said heated and stress-relieved portion and said second end of said tube.

15. A method as claimed in claim 13 in which said inserting step comprises moving said stressing member toward said end element and locating said stressing member at least partially within said heated and stress-relieved portion.

16. A method as claimed in claim 15 in which said moving and locating step is performed subsequent to said bonding step; whereby said mechanically-induced elastic diametral tensile strain is induced into at least a part of said stress-relieved portion.

17. A method as claimed in claim 16 in which said moving and locating step further comprises pressing a face of said stressing member substantially into contact with said end element subsequent to said bonding step.

* * * * *